US012707542B2

(12) United States Patent
Brandl et al.

(10) Patent No.: US 12,707,542 B2
(45) Date of Patent: Aug. 11, 2026

(54) LIGHT EMISSION ARRANGEMENT AND METHOD FOR OPERATING A LIGHT EMISSION ARRANGEMENT

(71) Applicant: ams-OSRAM International GmbH, Regensburg (DE)

(72) Inventors: Michael Brandl, Mintraching (DE); Sebastian Stigler, Scharmassing (DE)

(73) Assignee: ams-OSRAM International GmbH, Regensburg (DE)

( * ) Notice: Subject to any disclaimer, the term of this patent is extended or adjusted under 35 U.S.C. 154(b) by 124 days.

(21) Appl. No.: 18/570,378

(22) PCT Filed: Jun. 14, 2022

(86) PCT No.: PCT/EP2022/066159
§ 371 (c)(1),
(2) Date: Dec. 14, 2023

(87) PCT Pub. No.: WO2022/263440
PCT Pub. Date: Dec. 22, 2022

(65) Prior Publication Data
US 2024/0292504 A1 Aug. 29, 2024

(30) Foreign Application Priority Data
Jun. 17, 2021 (DE) ..................... 10 2021 115 713.7

(51) Int. Cl.
*H05B 45/22* (2020.01)
*H05B 45/30* (2020.01)
*H05B 45/325* (2020.01)

(52) U.S. Cl.
CPC .......... *H05B 45/22* (2020.01); *H05B 45/325* (2020.01)

(58) Field of Classification Search
CPC ........ H05B 45/00; H05B 45/10; H05B 45/20; H05B 45/12; H05B 45/22; H05B 45/30; H05B 45/40; H05B 45/44; H05B 45/325
See application file for complete search history.

(56) References Cited

U.S. PATENT DOCUMENTS 8,159,150 B2 * 4/2012 Ashdown .............. H05B 45/22 315/307
10,098,197 B2 10/2018 van de Ven et al.
(Continued)

FOREIGN PATENT DOCUMENTS

CN 101416100 A 4/2009
CN 101657056 A 2/2010
(Continued)

OTHER PUBLICATIONS

International Search Report issued for corresponding International Patent Application No. PCT/EP2022/066159 on Oct. 10, 2022, along with an English translation (5 pages).
(Continued)

*Primary Examiner* — Thai Pham
(74) *Attorney, Agent, or Firm* — HAUPTMAN HAM, LLP

(57) ABSTRACT

A light emission arrangement includes a driver arrangement having a first, a second, and a third driver. The light emission arrangement also includes a number N of assemblies. Each assembly includes a first, a second, and a third light-emitting semiconductor body. The number N is greater than 1. The first driver is coupled to a first series connection including the first light-emitting semiconductor bodies of the number N of assemblies. The second driver is coupled to a second series connection including the second light emitting-semiconductor bodies of the number N of assemblies. The third driver is coupled to a third series connection including the third light-emitting semiconductor bodies of the number N
(Continued)

Figure 1A:
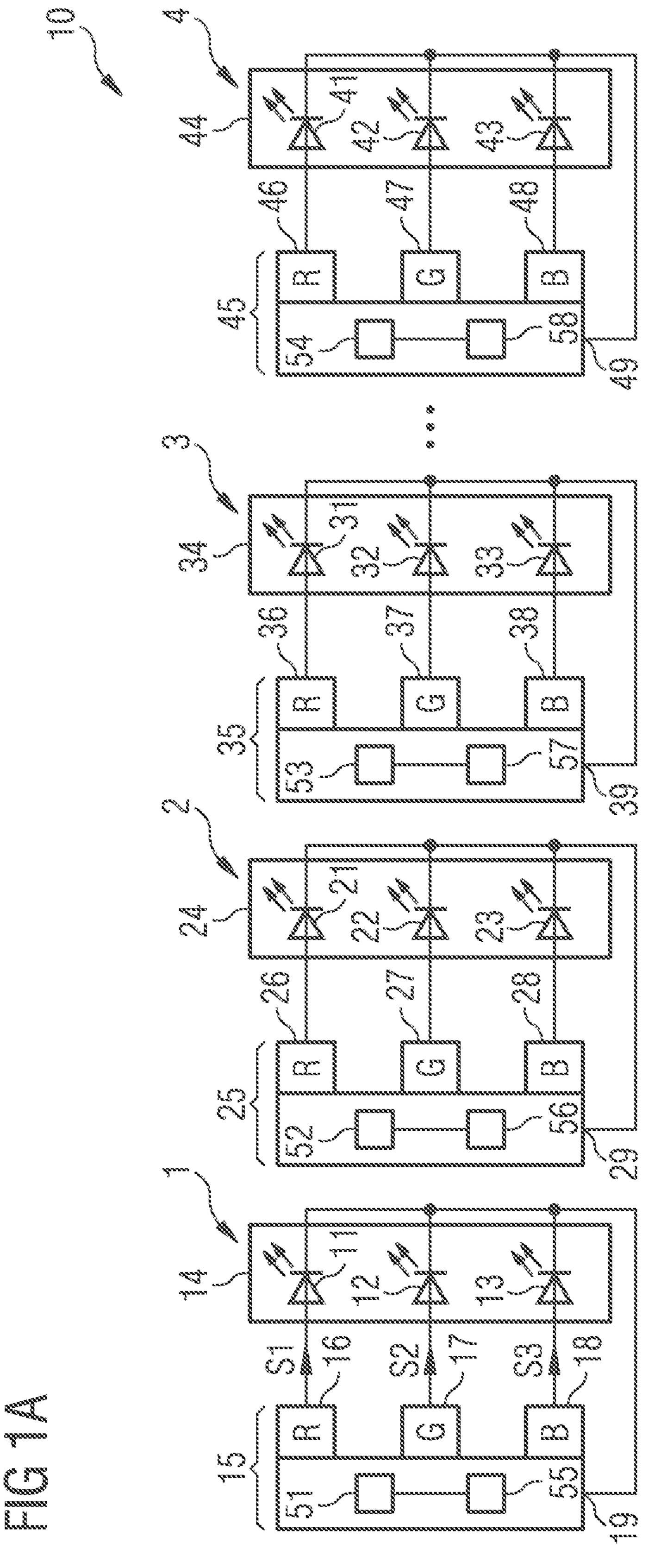

of assemblies. The first, second, and third driver are each configured to output a driver signal dependent on photometric quantities of the first, the second, and the third light-emitting semiconductor bodies of the number N of assemblies.

14 Claims, 7 Drawing Sheets

(56) References Cited

U.S. PATENT DOCUMENTS

| | | | | |
|---|---|---|---|---|
| 2004/0105261 | A1* | 6/2004 | Ducharme | F21V 23/045 362/231 |
| 2008/0238341 | A1 | 10/2008 | Korcharz et al. | |
| 2009/0021471 | A1 | 1/2009 | Park et al. | |
| 2009/0302781 | A1* | 12/2009 | Peker | H05B 45/22 315/297 |
| 2010/0061081 | A1 | 3/2010 | Muschaweck et al. | |
| 2010/0301777 | A1* | 12/2010 | Kraemer | H05B 45/325 315/312 |
| 2011/0291123 | A1 | 12/2011 | Hofmann et al. | |
| 2012/0049745 | A1* | 3/2012 | Li | H05B 45/20 315/153 |
| 2015/0230310 | A1* | 8/2015 | Sugaya | H05B 45/22 315/151 |
| 2016/0203771 | A1 | 7/2016 | Kwon et al. | |
| 2016/0323972 | A1* | 11/2016 | Bora | H05B 45/22 |
| 2018/0132329 | A1 | 5/2018 | Yan et al. | |

FOREIGN PATENT DOCUMENTS

| | | | |
|---|---|---|---|
| CN | 103025022 | A | 4/2013 |
| CN | 104113961 | A | 10/2014 |
| CN | 105578639 | A | 5/2016 |
| DE | 20 2016 104 159 | U1 | 10/2016 |
| JP | 2005-340809 | A | 12/2005 |
| JP | 2012-181942 | A | 9/2012 |
| WO | 2019/238527 | A1 | 12/2019 |

OTHER PUBLICATIONS

Written Opinion issued for corresponding International Patent Application No. PCT/EP2022/066159 on Oct. 10, 2022 (7 pages).

"LRTB GVSR, OSIRE® E3635", OSRAM Opto Semiconductors, Version 1.2, May 18, 2020 (32 pages).

Wang, "LED champing: statistically blessed", Applied Optics, vol. 54, No. 17, Jun. 10, 2015, pp. 5576-5580 (5 pages).

* cited by examiner

FIG 1D

| Nr. | A | B | C: Lichtstärke [cd] | | | D: Farbort | | | | | | E: Vorwärtsspannung [V] | | |
|---|---|---|---|---|---|---|---|---|---|---|---|---|---|---|
| | | | | | | CxR | CyR | CxG | CyG | CxB | CyB | | | |
| | | | rot | grün | blau | rot | rot | grün | grün | blau | blau | rot | grün | blau |
| 1 | | | 0,3901 | 0,9962 | 0,1204 | 0,7056 | 0,2940 | 0,1765 | 0,7420 | 0,1560 | 0,0211 | 1,84 | 2,53 | 2,77 |
| 2 | | | 0,3880 | 1,0208 | 0,1100 | 0,7058 | 0,2939 | 0,1740 | 0,7426 | 0,1578 | 0,0190 | 1,84 | 2,54 | 2,75 |
| 3 | | | 0,3985 | 1,0663 | 0,0991 | 0,7056 | 0,2939 | 0,1642 | 0,7415 | 0,1592 | 0,0178 | 1,84 | 2,54 | 2,76 |
| 4 | | | 0,3939 | 1,0460 | 0,1091 | 0,7056 | 0,2939 | 0,1636 | 0,7414 | 0,1591 | 0,0178 | 1,84 | 2,56 | 2,76 |
| • • • | | | | | | | | | | | | | | |
| n | | | 0,3906 | 1,0456 | 0,0957 | 0,7055 | 0,2941 | 0,1639 | 0,7413 | 0,1597 | 0,0172 | 1,84 | 2,53 | 2,76 |

Parameter I = 10 mA

FIG 1E

| Nr. | A | B | C: Lichtstärke [cd] | | | D: Farbort | | | | | | E: Vorwärtsspannung [V] | | |
|---|---|---|---|---|---|---|---|---|---|---|---|---|---|---|
| | | | | | | CxR | CyR | CxG | CyG | CxB | CyB | | | |
| | | | rot | grün | blau | rot | rot | grün | grün | blau | blau | rot | grün | blau |
| 1 | | | 1,9687 | 2,8895 | 0,4813 | 0,7058 | 0,2936 | 0,1405 | 0,7150 | 0,1574 | 0,0199 | 2,05 | 3,01 | 2,99 |
| 2 | | | 1,9663 | 2,9477 | 0,4415 | 0,7059 | 0,2935 | 0,1386 | 0,7140 | 0,1590 | 0,0182 | 2,04 | 3,04 | 2,95 |
| 3 | | | 2,0172 | 3,1012 | 0,4044 | 0,7058 | 0,2936 | 0,1326 | 0,7072 | 0,1603 | 0,0170 | 2,04 | 3,04 | 2,95 |
| 4 | | | 1,9947 | 2,9559 | 0,4166 | 0,7059 | 0,2936 | 0,1324 | 0,7065 | 0,1609 | 0,0169 | 2,04 | 3,08 | 2,95 |
| • • • | | | | | | | | | | | | | | |
| n | | | 1,9096 | 3,0518 | 0,3900 | 0,7058 | 0,2937 | 0,1325 | 0,7071 | 0,1608 | 0,0164 | 2,05 | 3,02 | 2,94 |

Parameter I = 50 mA

LIGHT EMISSION ARRANGEMENT AND METHOD FOR OPERATING A LIGHT EMISSION ARRANGEMENT

CROSS REFERENCE TO RELATED APPLICATION

This application is a National Stage of International Application No. PCT/EP2022/066159, filed on Jun. 14, 2022, which designates the United States and was published in Europe, and which claims priority to German Patent Application No. 10 2021 115 713.7, filed on Jun. 17, 2021, in the German Patent Office. All of the aforementioned applications are hereby incorporated by reference in their entireties.

A light emission arrangement and a method for operating a light emission arrangement are specified.

A light emission arrangement may comprise one or more assemblies. For example, an assembly comprises a first, a second, and a third light-emitting semiconductor body and a package. The first, second, and third light-emitting semiconductor body are inserted in the package. The first, second, and third light-emitting semiconductor body may be realized, for example, as light-emitting diode chips emitting in the red, green, and blue spectrums. A driver arrangement supplies the first, second, and third light-emitting semiconductor body of an assembly. Thereby, the driver arrangement can be arranged in the package of the assembly or realized externally outside the package of the assembly. A first driver of the driver arrangement supplies the first light-emitting semiconductor body with current or voltage values suitable for this specimen of the first light-emitting semiconductor body. Corresponding applies to a second and a third driver of the driver arrangement. However, the supply of each light-emitting semiconductor body by its own driver may cause a high effort.

It is an object to specify a light emission arrangement and a method for operating a light emission arrangement in which the effort is kept low.

This object is solved by the light emission arrangement and the method for operating a light emission arrangement according to the independent claims. Further embodiments of the light emission arrangement or the method for operating a light emission arrangement are the subject of the dependent claims.

In at least one embodiment, a light emission arrangement comprises a driver arrangement comprising a first driver, a second driver, and a third driver, and a number N of assemblies each comprising a first, a second, and a third semiconductor body. The number N is greater than 1. The first driver is coupled to a first series connection comprising the first light-emitting semiconductor bodies of the number N of assemblies. The second driver is coupled to a second series connection comprising the second light-emitting semiconductor bodies of the number N of assemblies. Further, the third driver is coupled to a third series connection comprising the third light-emitting semiconductor bodies of the number N of assemblies.

The first, the second, and the third driver are each configured to output a driver signal depending on photometric quantities of the first, the second, and the third light-emitting semiconductor bodies of the number N of assemblies.

With advantage, the first driver supplies a number N of first light-emitting semiconductor bodies. Accordingly, the second driver supplies a number N of second light-emitting semiconductor bodies and the third driver supplies a number N of third light-emitting semiconductor bodies. Thus, the effort required to realize the light emission arrangement is kept small. Thereby, photometric quantities of the light emitting semiconductor bodies are taken into account.

For example, the number N of first light-emitting semiconductor bodies emit in the red spectrum. Further, the number N of second light-emitting semiconductor bodies emit in the green spectrum. Furthermore, the number N of third light-emitting semiconductor bodies emit in the blue spectrum. Since the semiconductor bodies of the number N of first light-emitting semiconductor bodies usually do not have identical but similar properties, it is sufficient to drive them together. Corresponding applies to the second and third light-emitting semiconductor bodies.

In an example, the parameters of the first, second, and third driver are adjusted corresponding to measured values of the number N of first, second, and third light-emitting semiconductor body, such as the luminous intensity and/or chromaticity coordinate at a predetermined value for a current, and depending on a target chromaticity coordinate and/or target luminous intensity. The assembly is realized, for example, as a red-green-blue assembly, abbreviated as RGB assembly. The target chromaticity coordinate may also be referred to as predetermined or aspired chromaticity coordinate or predetermined target chromaticity coordinate. The target luminous intensity may also be referred to as predetermined or aspired luminous intensity or predetermined target luminous intensity.

In at least one embodiment of the light emission arrangement, an assembly of the number N of assemblies each comprises a package. Hence, an assembly may be referred to as an LED package, for example.

In at least one embodiment of the light emission arrangement, the driver arrangement comprises a memory. The first, the second, and the third driver are each configured to output a pulse width modulated driver signal with a first, a second, and a third duty cycle and to adjust the first, second, and third duty cycles corresponding to an information stored in the memory. With advantage, a luminous intensity emitted on average during a period of the pulse width modulated driver signal is adjusted by the first, second, and third duty cycle, and not exclusively by a level of the pulses of the driver signals. The human eye is too slow to perceive the pulses individually.

In at least one embodiment of the light emission arrangement, the first duty cycle of the first driver is an average value of a number N of target duty cycles of the first light-emitting semiconductor bodies of the number N of assemblies. The second duty cycle of the second driver is an average value of a number N of target duty cycles of the second light-emitting semiconductor bodies of the number N of assemblies. The third duty cycle of the third driver is an average value of a number N of target duty cycles of the third light-emitting semiconductor bodies of the number N of assemblies. With advantage, by averaging, the three duty cycles are adapted to the assemblies incorporated in the specific light emission arrangement.

In at least one embodiment of the light emission arrangement, the target duty cycles of the first, the second, and the third light-emitting semiconductor body in an assembly of the number N of assemblies are determined assembly by assembly in dependence of the photometric quantities of the first, the second, and the third light-emitting semiconductor body and corresponding to a target chromaticity coordinate and/or a target luminous intensity. Since the photometric quantities of the three light-emitting semiconductor bodies as well as the target chromaticity coordinate and/or the target luminous intensity are known, three target duty cycles for the three light-emitting semiconductor bodies can be determined in each assembly. The target duty cycles are determined, for example, by converting the photometric quantities of the three light-emitting semiconductor bodies of each assembly into tristimulus coordinates, by converting the target chromaticity coordinate and the target luminous intensity into tristimulus coordinates of the target, and by solving the corresponding equations (given below). By averaging, the three duty cycles are then defined.

In at least one embodiment of the light emission arrangement, at least one photometric quantity of the first light-emitting semiconductor bodies of the number N of assemblies is averaged. Further, at least one photometric quantity of the second light-emitting semiconductor bodies of the number N of assemblies is averaged. Likewise, at least one photometric quantity of the third light-emitting semiconductor bodies of the number N of assemblies is averaged. The first duty cycle of the first driver, the second duty cycle of the second driver, and the third duty cycle of the third driver are determined corresponding to a target chromaticity coordinate and/or a target luminous intensity and corresponding to the average values of the at least one photometric quantity. The determination of the three duty cycles is carried out, for example, by converting the average values of the at least one photometric quantity into tristimulus coordinates, converting the target chromaticity coordinate and target luminous intensity into tristimulus coordinates of the target, and solving the corresponding equations (given below).

In at least one embodiment of the light emission arrangement, the at least one photometric quantity comprises:

- a luminous intensity of the first, the second, and the third light-emitting semiconductor body or
- a luminous intensity and both chromaticity coordinates of the first, the second, and the third light-emitting semiconductor body or
- tristimulus coordinates of the first, the second, and the third light-emitting semiconductor bodies.

In an example, one of the three tristimulus coordinates, two of the three tristimulus coordinates, or all three of the three tristimulus coordinates are determined from the average value or the average values of the at least one photometric quantity. The tristimulus coordinates not determined by the average values of the at least one photometric quantity may be replaced, for example, by standard values of a batch of assemblies or of a class.

In an example, an average value is calculated using one of the following methods:

- the average value is calculated as the arithmetic average. The arithmetic average is the sum of the given values divided by the number of values.
- the average value is calculated as median. The median divides a list of given values into two equal parts in such a way that the values in one half are not greater than the median value and in the other half are not less than the median value. The median thus describes a value that divides the set of values into two halves.
- the average value is calculated as a quadratic average value. Thereby, the values are squared and the sum of the squared values is divided by the number of values. The quadratic average value is the square root of the value of the division.
- the average value is calculated according to the method of least squares or least squares of error. The average value is the number for which a sum of squares yields the smallest value. The squares are the squares of the difference of the given values and the number. Thus, the average value is the value at which the sum of the squares of deviations becomes minimum.

In at least one embodiment of the light emission arrangement, the first light-emitting semiconductor bodies are realized as light emitting diode chips emitting in the red spectrum. The second light-emitting semiconductor bodies are realized as light-emitting diode chips emitting in the green spectrum. The third light-emitting semiconductor bodies are realized as light-emitting diode chips emitting in the blue spectrum.

In at least one embodiment of the light emission arrangement, at least one driver from a group comprising the first, second, and third driver is configured to adjust a level of the pulse width modulated driver signal corresponding to an information stored in the memory. The chromaticity coordinate values of the light-emitting semiconductor body can be shifted by the level of the drive signal.

In at least one embodiment of the light emission arrangement, an assembly of the number N of assemblies each comprises a fourth light-emitting semiconductor body. Further, the driver arrangement comprises a fourth driver. The fourth driver is coupled to a fourth series connection comprising the fourth light-emitting semiconductor bodies of the number N of assemblies. The fourth light-emitting semiconductor bodies may be realized, for example, as light-emitting diode chips that emit outside the red, green, and blue spectrum. The fourth light-emitting semiconductor bodies are realized e.g. as light emitting diode chips emitting in the yellow spectrum, in the long wavelength blue spectrum, in the short wavelength green spectrum or in the long wavelength green spectrum or e.g. as fully converted light-emitting diode chips (e.g. light emitting diode chips with converter emitting in the blue spectrum). With advantage it can be achieved with the fourth light-emitting semiconductor bodies that e.g. more colors can be represented, thus to change the gamut to be able to cover different requirements.

In at least one embodiment, the light emission arrangement is configured for backlighting, accenting, or illumination.

In at least one embodiment, a method for operating a light emission arrangement is provided, wherein the light emission arrangement comprises a number N of assemblies each comprising a first, a second, and a third semiconductor light emitting body. Thereby, the method comprises:

- operating a series connection comprising the first light-emitting semiconductor bodies of the number N of assemblies with a first driver signal by a first driver of a driver arrangement,
- operating a series connection comprising the second light-emitting semiconductor bodies of the number N of assemblies with a second driver signal by a second driver of the driving arrangement, and
- operating a series connection comprising the third semiconductor light-emitting bodies of the number N of assemblies with a third driver signal by a third driver of the driving arrangement, wherein the number N is greater than 1.

In an example, the first, the second, and the third driver signals depend on photometric quantities of the first, the second, and the third light-emitting semiconductor bodies of the number N of assemblies.

With advantage, the first driver operates the first light-emitting semiconductor bodies of the number N of assemblies. Corresponding applies to the second and the third driver.

The method described herein is particularly suitable for operating the light emission arrangement described herein.

The features described in connection with the light emission arrangement can therefore also be used for the method and vice versa.

In at least one embodiment of the method, the first, second, and third driver each output a pulse width modulated driver signal with a first, second, and third duty cycle. The first, second, and third driver adjust the first, second, and third duty cycles corresponding to an information stored in a memory of the driver arrangement. With advantage, the first, second, and third duty cycle are calculated by averaging photometric quantities of the first, second, and third light-emitting semiconductor bodies of the number N of assemblies and then stored in the memory.

In at least one embodiment, the method comprises:

- determining the first duty cycle of the first driver by identifying an average value of a number N of target duty cycles of the first light-emitting semiconductor bodies of the number N of assemblies,
- determining the second duty cycle of the second driver by identifying an average value of a number N of target duty cycles of the second light emitting semiconductor bodies of the number N of assemblies, and
- determining the third duty cycle of the third driver by identifying an average value of a number N of target duty cycles of the third light emitting semiconductor bodies of the number N of assemblies.

In at least one embodiment of the method, the target duty cycles of the first, the second, and the third light-emitting semiconductor body in an assembly of the number N of assemblies are determined assembly by assembly corresponding to a target chromaticity coordinate or/and a target luminous intensity.

In at least one embodiment, the method comprises identifying a first average value of at least one photometric quantity of the first light-emitting semiconductor bodies of the number N of assemblies, identifying a second average of at least one photometric quantity of the second light-emitting semiconductor bodies of the number N of assemblies, and identifying a third average value of at least one photometric quantity of the third light-emitting semiconductor bodies of the number N of assemblies, and determining the first duty cycle of the first driver, the second duty cycle of the second driver, and the third duty cycle of the third driver corresponding to a target chromaticity coordinate and/or a target luminous intensity and corresponding to the first, second, and third average values of the at least one photometric quantity.

In at least one embodiment of the method, the at least one photometric quantity comprises:

- a luminous intensity of the first, second, and third light-emitting semiconductor body or
- a luminous intensity and both chromaticity coordinates of the first, second, and third light-emitting semiconductor body or
- tristimulus coordinates of the first, second, and third light-emitting semiconductor body.

In an example, the at least one photometric quantity is a measured quantity or at least one measured quantity. The photometric quantities of the first, the second, and the third light-emitting semiconductor bodies of the number N of assemblies are measured photometric quantities of the first, the second, and the third light-emitting semiconductor bodies of the number N of assemblies, such as the luminous intensity and/or the chromaticity coordinate. The photometric quantities of the first, the second, and the third light-emitting semiconductor bodies of the number N of assemblies are measured values or values identified from measured values. For example, the measurement is performed at a predetermined value or several predetermined values for a current flowing through the respective light-emitting semiconductor body. In an example, no target value or no target values are designated by the at least one photometric quantity.

In at least one embodiment of the method, an average value of the above or below average values is calculated using one of the following methods:

- the average value is calculated as an arithmetic average,
- the average value is calculated as median,
- the average value is calculated as a quadratic average value, or
- the average value is calculated according to the method of the least squares.

In an example, a standard deviation of the values is calculated in addition to the average value. If the standard deviation is greater than a predetermined value, the light emission arrangement is no longer used, for example. The standard deviation can thus be used as an evaluation or quality criterion.

In an example, the chromaticity coordinate of the light emission arrangement at the first, second, and third duty cycles determined according to any of the methods described is identified calculative or by a measurement. If the chromaticity coordinate is not within a predetermined number of x MacAdam ellipses in the CIE standard valence system or CIE standard color system around the target chromaticity coordinate, for example, the light emission arrangement is not used further. The position within or outside the predetermined number x of MacAdam ellipses around the target chromaticity coordinate can thus be used as an evaluation or quality criterion. The predetermined number x may also be referred to as the required number. The predetermined number x is e.g. 3 or 9. The predetermined number x is e.g. less than or equal to 3, 9, 15 or 27.

In a further development, the first, second, and third duty cycles are iteratively changed until the chromaticity coordinate of the light emission arrangement is within the predetermined number of x MacAdam ellipses around the target chromaticity coordinate. The chromaticity coordinate is identified calculative or by a measurement. Thus, for example, the values of the first, second and third duty cycle calculated by averaging serve as the starting point of an iteration.

In an embodiment of the method, a light arrangement comprises number M of light emission arrangements. The number M is greater than 1. A light emission arrangement of the number M of light emission arrangements comprises the number N of assemblies. The first, second, and third driver signals depend on photometric quantities of the first, second, and third light-emitting semiconductor bodies of the assemblies of the number M of light emission arrangements. In an example, the number M of light emitting arrangements is integrated together in one application. With advantage, the chromaticity coordinate obtained by the light emitting arrangement as a whole is made to deviate as little as possible from the target chromaticity coordinate.

In an example, the first, second, and third driver signals of the number M of light emission arrangements are identical. Thus, the chromaticity coordinate achieved by the light emission arrangement as a whole is optimized (so that it approaches the target chromaticity coordinate), rather than the chromaticity coordinate of one of the light emission arrangements.

In an example, a further light emission arrangements of the number M of light emission arrangements comprises a further number N1 of assemblies. The further number N1 is identical to or different from the number N. The further number is greater than 0 or greater than 1.

In an embodiment, the method describes an improved method for calibrating RGB assemblies and/or semiconductor bodies emitting light in the red, green, and blue spectrum without providing individual drivers for the RGB assembly. For example, the method can be used for RGB light emitting diodes, multi-color light emitting diodes, RGB assemblies, assemblies with four semiconductor bodies, and/or multi-color assemblies where calibration data (for example, by a data matrix code) is known. With advantage, the method and the light emission arrangement are suitable for RGB or multi-color applications which require a narrow definition of the chromaticity coordinate. For example, the light emission arrangement and the method for operating a light emission arrangement are applicable to automotive, aviation, industrial equipment, white goods equipment, and high quality lighting.

With advantage, a high color accuracy or a high chromaticity coordinate accuracy, respectively, can be achieved even if not every light-emitting diode chip is controlled individually. This can be achieved for light-emitting diode chips from one reel or one bin. However, it can furthermore be achieved for light-emitting diode chips from multiple reels or bins, provided that the specified chromaticity coordinate is within the specification of the allowed set of colors representable with the light-emitting diodes. The allowed set of colors representable with the light-emitting diodes is also referred to as the gamut. The method of operating the light emission arrangement thus performs a calibration of the color or chromaticity coordinate. With advantage, the color or chromaticity coordinate of the light emission arrangement is thus adjusted by the method. Advantageously, the method achieves a high color homogeneity or chromaticity coordinate homogeneity of the light emission arrangement or an arrangement comprising a plurality of light emission arrangements.

For RGB lighting, in-application calibration is often used since the tolerances of the supplied assemblies do not allow sufficiently accurate color control. A solution is to provide the data about each individual light-emitting diode chip or assembly e.g. by DMC code and/or database. Then this data can be used and each assembly can be controlled to achieve a very well controlled color. For example, a driver arrangement is used per assembly. An individual control of assemblies by external drivers or drivers integrated in the respective assembly takes place depending on the data of the assembly.

In an embodiment, to save costs, light-emitting semiconductor bodies are not controlled individually, but some of the light-emitting semiconductor bodies emitting the same color are controlled together. For example, four or six assemblies with their respective colors R, G and B are connected in series. Then a single assembly can no longer be calibrated. It is advantageous to use the data of the individual assemblies even for such non-individual driver solutions.

In an embodiment, the light emission arrangement or method uses the data known for each individual light-emitting semiconductor body (for example, individual light-emitting diode chip). This data is used even if a red, green, or blue color of the light-emitting semiconductor bodies or the assembly comprising the first, second, and third light-emitting semiconductor body cannot be adjusted individually, but only in combination with the corresponding colors of the other light-emitting semiconductor bodies or assemblies. Data from each light-emitting semiconductor body or von each assembly is measured or taken from a database of measured values and analyzed in the context of all light-emitting semiconductor bodies or assemblies in the application. Thereupon, a best possible calibration for a target chromaticity coordinate is performed. For example, this can be performed for a single light emission arrangement, also called a cluster. Alternatively, this may be performed for the entire application, comprising multiple light emission arrangements. Additionally, the method for operating a light emission arrangement may, for example, detect which light-emitting semiconductor bodies or which assemblies are wired together and take this information into account in calculating the parameters of the driver arrangement of a single light emission arrangement or an arrangement comprising several light emission arrangements. For example, a parameter of the driver arrangement is the duty cycle of a pulse width modulated driver signal.

With advantage, in this way the available individual data of the light-emitting semiconductor bodies are not lost due to driving a light emission arrangement, but are used to determine a best possible result for the entire application. Additionally, a peak current can be adapted to shift the dominant wavelength of light-emitting semiconductor bodies, for example, light-emitting semiconductor bodies emitting in the green spectrum and/or in the blue spectrum. The information about the characteristics of the individual assembly or the individual light-emitting semiconductor bodies is taken into account to optimize the light emission arrangement. Advantageously, this achieves cost-effective yet relatively accurate color control. For example, the chromaticity coordinate is averaged based on a number of assemblies connected in a light emission arrangement or cluster to achieve a good approximation of a target chromaticity coordinate. Alternatively or additionally, the chromaticity coordinates of several light emission arrangements or clusters are averaged to achieve a common chromaticity coordinate that is as close as possible to the target chromaticity coordinate to improve homogeneity across the assemblies, light emission arrangements, or clusters.

Figure 2A:
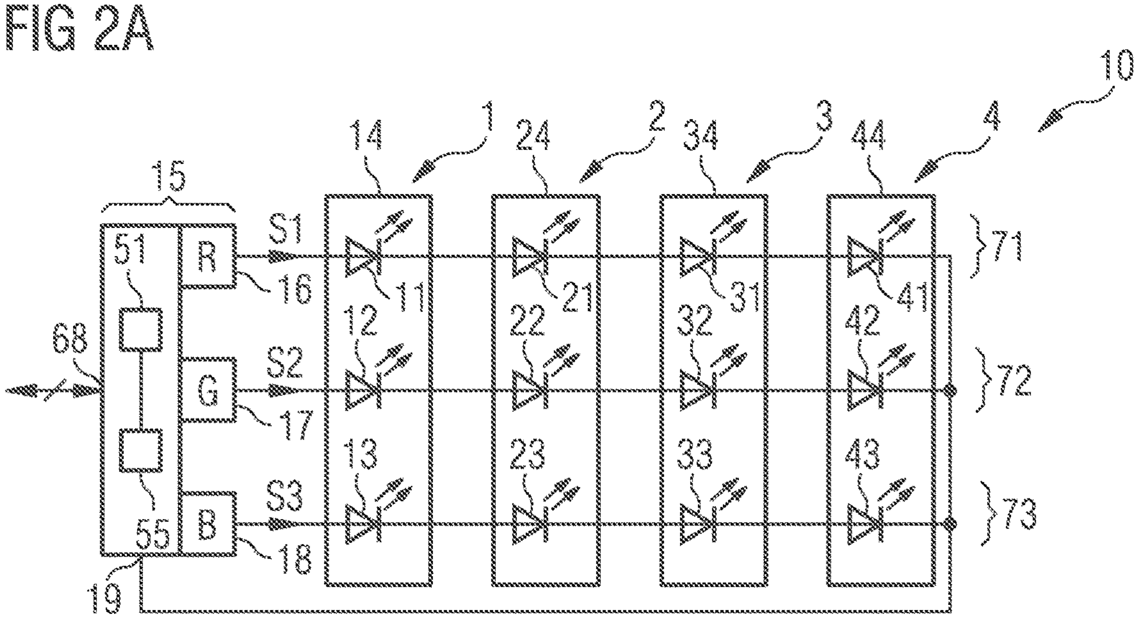
Figure 2B:
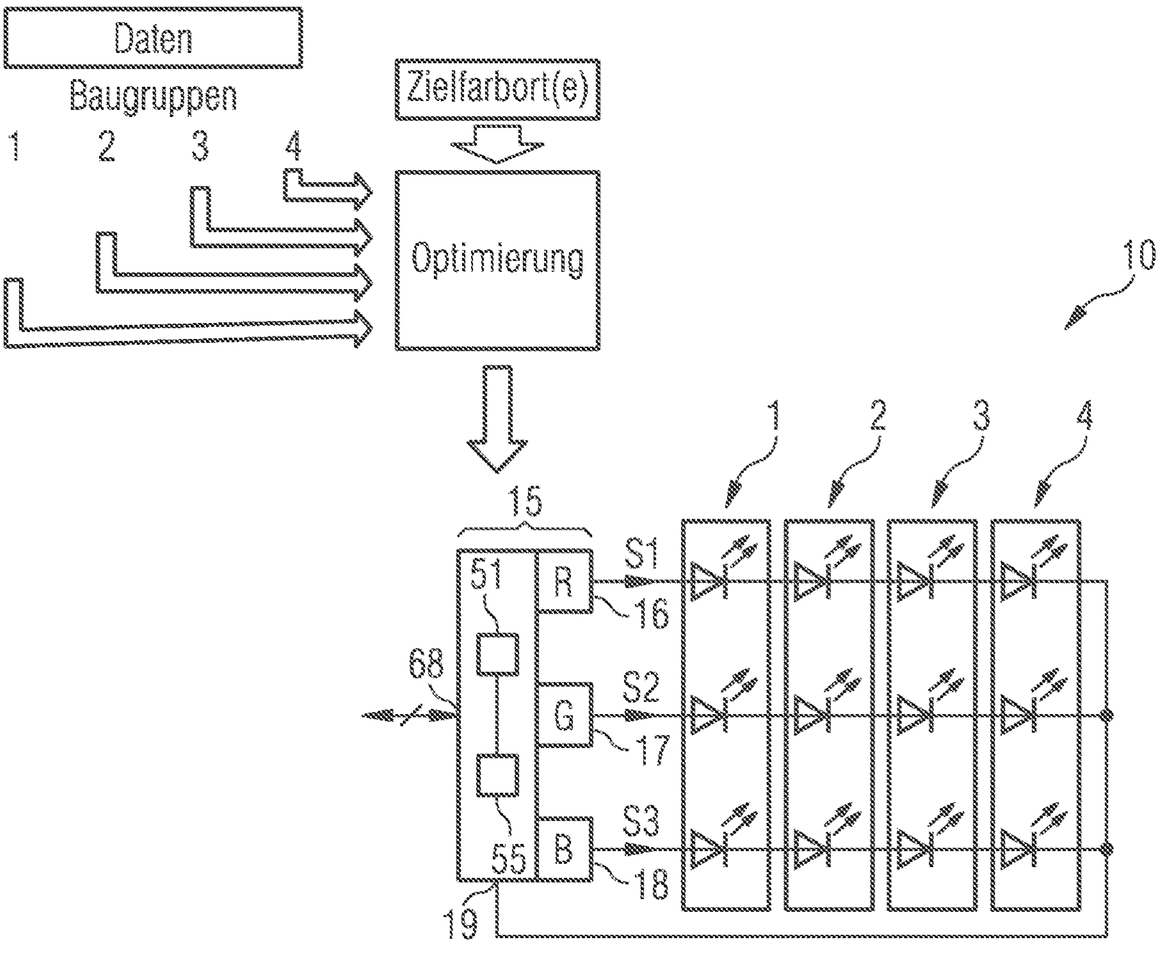
Figure 2C:
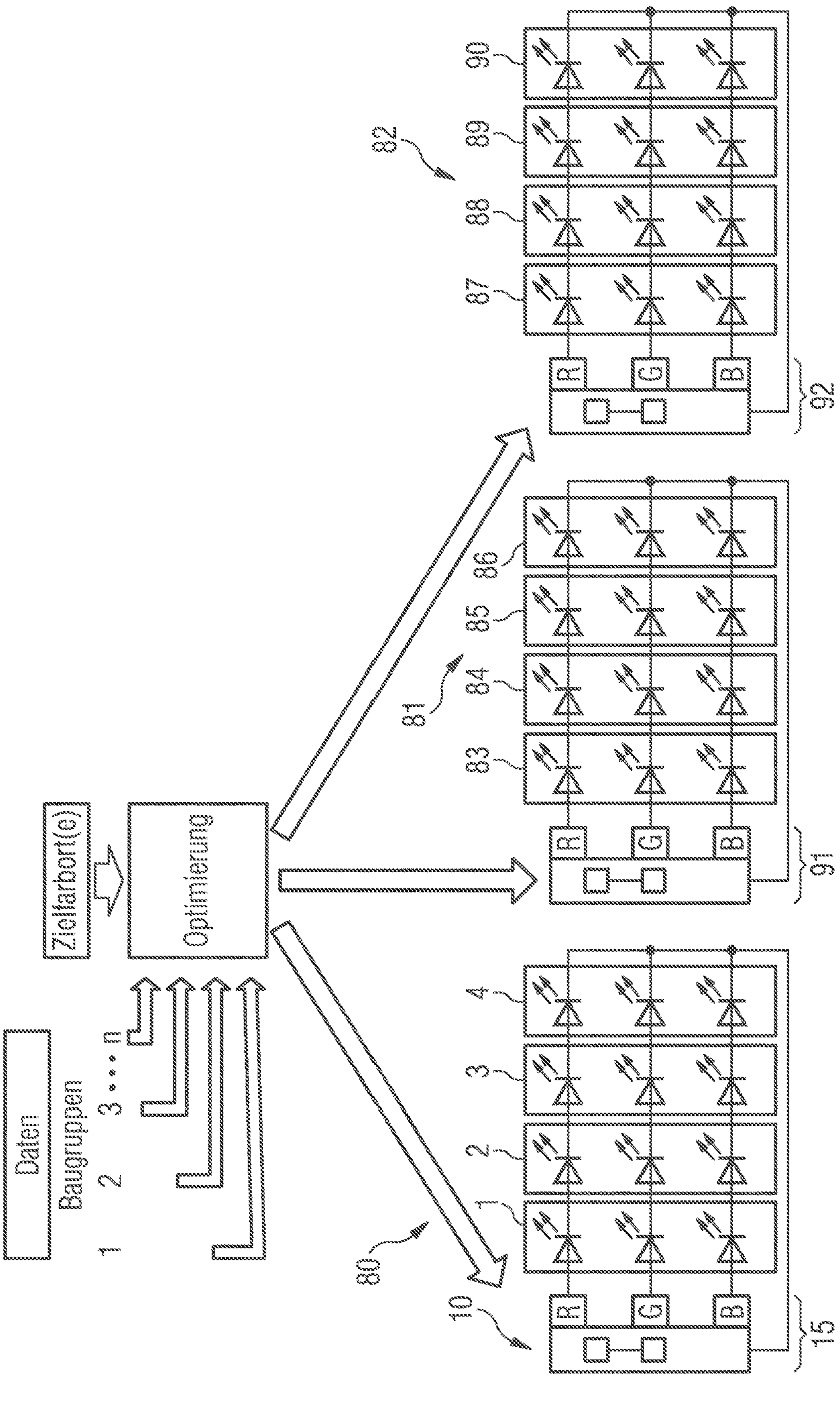
Figure 3A:
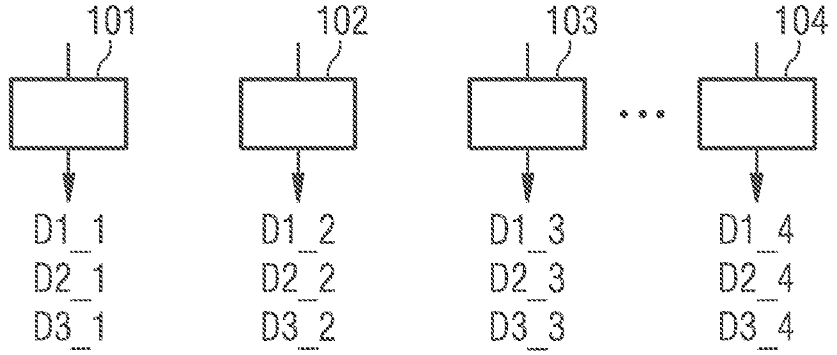
Figure 3B:
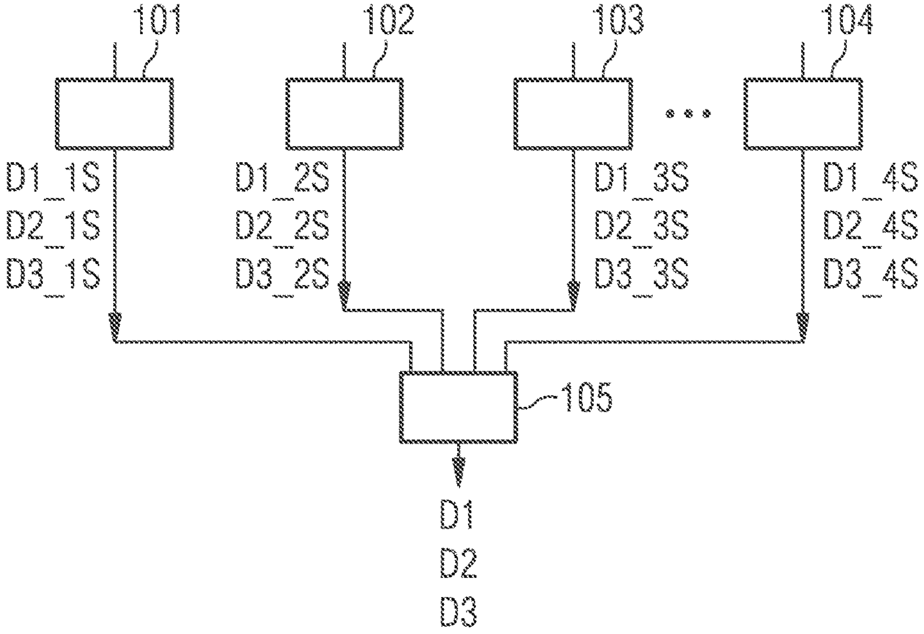
Figure 3C:
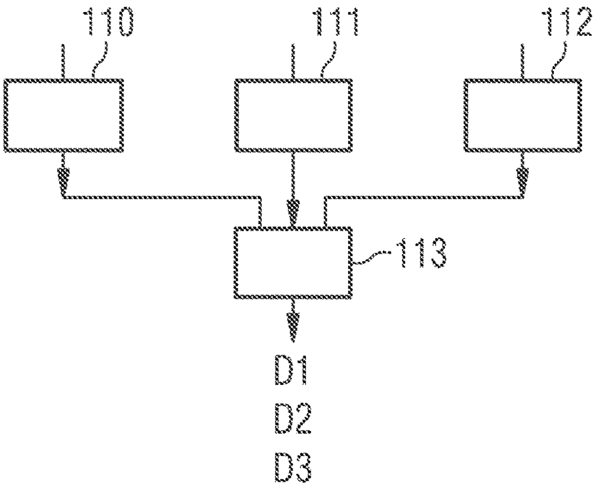

Further embodiments and developments of the light emission arrangement or of the method for operating a light emission arrangement result from the exemplary embodiments explained below in connection with FIGS. 1A to 3C. Identical, similar or identically acting circuit parts, semiconductor bodies and components are provided with the same reference signs in the figures. It shows:

FIGS. 1A to 1E an exemplary embodiment of a light emission arrangement and an assembly;

FIGS. 2A to 2C exemplary embodiments of a light emission arrangement and a method for operating a light emission arrangement; and FIGS. 3A to 3C exemplary embodiments of a method for operating a light emission arrangement.

FIG. 1A shows an exemplary embodiment of a light emission arrangement 10 with a number N of assemblies 1 to 4. In the exemplary embodiment according to FIG. 1A, the number N is equal to 4. The number N is greater than 1. The number N may also be greater than 2, greater than 3, or greater than 10 (as indicated by the dots). Each assembly of the number N of assemblies 1 to 4 comprises a first, second, and third light-emitting semiconductor body 11 to 13, 21 to 23, 31 to 33, 41 to 43. The first light-emitting semiconductor bodies 11, 21, 31, 41 of the number N of assemblies 1 to 4 emit in the same spectrum, for example in the red spectrum. Correspondingly, the second light-emitting semiconductor bodies 12, 22, 32, 42 of the number N of assemblies 1 to 4 emit in a different spectrum, for example in the green spectrum. Furthermore, the third light-emitting semiconductor bodies 13, 23, 33, 43 of the number N of assemblies 1 to 4 emit in a further spectrum, for example in the blue spectrum. A first assembly 1 (often called an assembly 1 or the assembly 1) of the number N of assemblies 1 to 4 comprises a package 14 (indicated here as a rectangle). Here, for example, each of the number N of assemblies 1 to 4 has its own package 14, 24, 34, 44.

Additionally, the light emission arrangement 10 comprises a driver arrangement 15 comprising a first, a second, and a third driver 16, 17, 18. The first driver 16 is coupled to the first light-emitting semiconductor body 11 of the first assembly 1. Correspondingly, the second driver 17 is coupled to the second light-emitting semiconductor body 12 of the first assembly 1. In an analogous way, the third driver 18 is coupled to the third light-emitting semiconductor body 13 of the first assembly 1. For example, the first light-emitting semiconductor body 11 couples an output of the first driver 16 to a terminal 19 of the driver arrangement 15. Further, the second light-emitting semiconductor body 12 couples an output of the second driver 17 to the terminal 19 of the driver arrangement 15. Similarly, the third light-emitting semiconductor body 13 couples an output of the third driver 18 to the terminal 19 of the driver arrangement 15. As shown in FIG. 1A, the driver arrangement 15 is realized outside the package 14 of the first assembly 1.

According to FIG. 1A, the light emission arrangement 10 comprises a number N of driver arrangements 15, 25, 35, 45. The driver arrangements of the number N of driver arrangements 15, 25, 35, 45 are realized as the driver arrangement 15. Thus, a driver arrangement 15, 25, 35, 45 is associated with each assembly 1 to 4. With advantage, the three drivers 16 to 18 are adapted to the characteristics of the three connected light-emitting semiconductor bodies 11 to 13.

The first driver 16 outputs a first driver signal S1 at its output. The second driver 17 outputs a second driver signal S2 at its output. The third driver 18 outputs a third driver signal S3 at its output. The first, second, and third driver signals S1, S2, S3 are realized as current or voltage signals. Typically, the first, second, and third driver signals S1, S2, S3 are executed as current signals.

The first, second, and third light-emitting semiconductor bodies 11 to 13 can each be implemented as a light-emitting diode chip, abbreviated as LED chip, or as a light-emitting diode die, abbreviated as LED die. Corresponding applies to the other assemblies. In an example, an anode of the LED die of the first semiconductor body 11 is connected to the output of the first driver 16. A cathode of the LED chip of the first semiconductor body 11 is coupled to the terminal 19 of the driver arrangement 15. An anode of the LED chip of the second semiconductor body 12 is connected to the output of the second driver 17. A cathode of the LED chip of the second semiconductor body 12 is coupled to the terminal 19 of the driver arrangement 15. An anode of the LED chip of the third semiconductor body 13 is connected to the output of the third driver 18. A cathode of the LED chip of the third semiconductor body 13 is coupled to the terminal 19 of the driver arrangement 15.

The driver arrangement 15 comprises a memory 51. The driver arrangements of the number N of driver arrangements 15, 25, 35, 45 each comprise a memory 51 to 54. Further, the driver arrangement 15 comprises a control circuit 55 coupled to the memory 51. The control circuit 55 controls the first, second, and third driver 16 to 18. The driver arrangements of the number N of driver arrangements 15, 25, 35, 45 each comprise a control circuit 55 to 58 coupled to the memory 51 to 54 of the respective driver arrangement and controlling the respective first, second, and third driver 16 to 18, 26 to 28, 36 to 38, 46 to 48.

In an alternative embodiment not shown, the anode of the LED chip of the first semiconductor body 11 is coupled to the terminal 19 of the driver arrangement 15. The cathode of the LED chip of the first semiconductor body 11 is coupled to the output of the first driver 16. The anode of the LED chip of the second semiconductor body 12 is connected to the terminal 19 of the driver arrangement 15. The cathode of the LED chip of the second semiconductor body 12 is coupled to the output of the second driver 17. The anode of the LED chip of the third semiconductor body 13 is connected to the terminal 19 of the driver arrangement 15. The cathode of the LED chip of the third semiconductor body 13 is coupled to the output of the third driver 18.

In an alternative embodiment not shown, the driver arrangement 15 may be realized within the package 14 of the assembly 1. In the packages of the number N of assemblies 1 to 4, the respective driver arrangements 15, 25, 35, 45 may be located.

In an alternative embodiment not shown, the light emission arrangement 10 comprising the number N of assemblies with N>1 comprises exactly one control circuit 55 coupled to and controlling the number N of driver arrangements 15, 25, 35, 45. The light emission arrangement 10 comprises a memory 51 coupled to the control circuit 55.

Figure 1B:
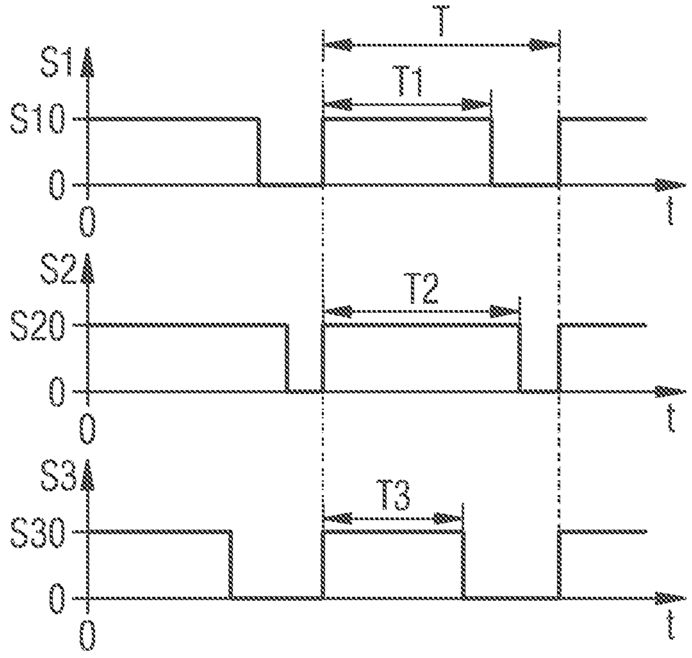

FIG. 1B shows an exemplary embodiment of the driver signals S1, S2, S3 of the driver arrangement 15, which is a development of the exemplary embodiment shown in FIG. 1A. In FIG. 1B, the first, second, and third driver signal S1, S2, S3 are shown as a function of a time t. The first, second, and third drive signal S1, S2, S3 comprise a period T. For example, the period T of the three driver signals S1, S2, S3 is identical. Thus, the driver signals S1, S2, S3 have a frequency F=1/T. The first driver signal S1 comprises a pulse with a first pulse duration T1. Correspondingly, the second driver signal S2 comprises pulses with a second pulse duration T2 and the third driver signal S3 comprises pulses with a third pulse duration T3. Thus, a first, a second, and a third duty cycle D1, D2, D3 (also called phase control factor or duty factor) are obtained for the first, second, and third driver signal S1, S2, S3 according to the following equations:

$$D1 = T1/T;$$

$$D2 = T2/T$$

and $$D3 = T3/T$$

Since pulse duration and duty cycle differ only by a factor which is constant, a calculation of pulse durations can be analogous to a calculation of duty cycles and vice versa. The first, second, and third pulse duration T1, T2, T3 comprise different values. Correspondingly, the first, second and third duty cycle D1, D2, D3 comprise different values. Exclusively in exceptional cases (rather coincidentally), two or three of the pulse durations comprise an identical value. Typically, the first, second and third driver signal S1, S2, S3 is realized as a current. The pulses of the first, second, and third driver signal S1, S2, S3 comprise a first, second, and third level S10, S20, S30. The first, second and third level S10, S20, S30 can comprise the same value. Alternatively, the first, second and third level S10, S20, S30 comprise two or three different values.

Figure 1C:
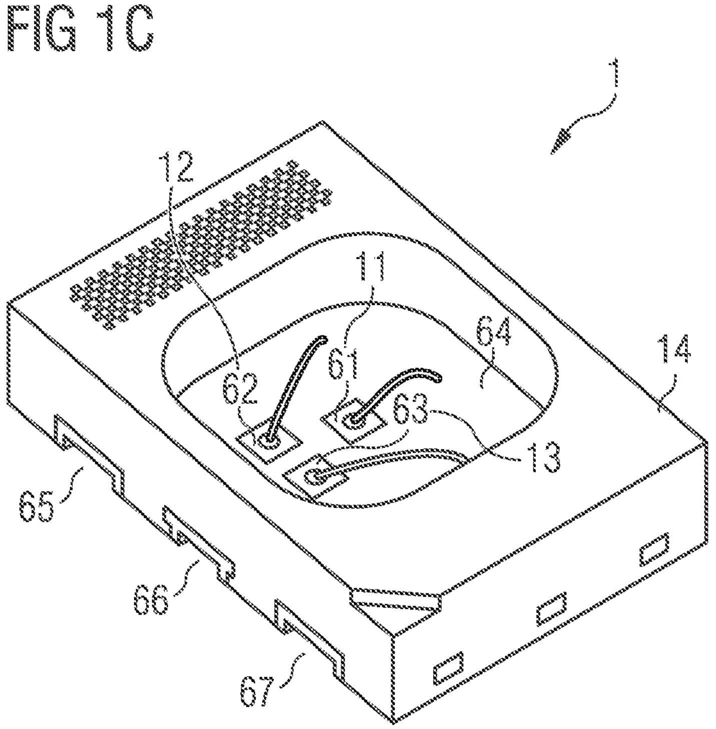

FIG. 1C shows an exemplary embodiment of a first assembly 1, which is a development of the exemplary embodiment shown in FIGS. 1A and 1B. The first assembly 1 may be used, for example, in the light emission arrangement 10 shown in FIGS. 1A and 1B. The assemblies of the number N of assemblies 1 to 4 are realized, for example, as the first assembly 1. The first assembly 1 comprises the first, second, and third semiconductor light-emitting body 11 to 13, which are realized as the first, second, and third LED chip 61 to 63. The first, second, and third LED chip 61 to 63 are arranged at the bottom of a recess 64 of the package 10. The recess 64 is covered by a transparent cover (not shown). The cover may comprise a lens shape. The first assembly 1 is implemented as a surface mounted device, abbreviated as SMD. The package 14 comprises a polymer. The package 14 is a plastic package. In this example, the package 1 is realized as a chip carrier, e.g. a plastic leaded chip carrier, abbreviated PLCC.

The package 1 comprises at least four terminals. Typically, the package 1 comprises four or six terminals, for example, if the number of light-emitting semiconductor bodies in the package is three. The package may have five or eight terminals, for example, if the number of light-emitting semiconductor bodies in the package is four. In the illustration shown in FIG. 1C, three terminals 65 to 67 thereof are shown. Two of the six terminals 65 to 67 of the package 1 lead to the two terminals of the first light-emitting semiconductor body 11. Correspondingly, two further terminals of the six terminals 65 to 67 lead to the two terminals of the second light-emitting semiconductor body 12. Consequently, two additional terminals of the six terminals 65 to 67 lead to the two terminals of the third light-emitting semiconductor body 13. Thus, the three light-emitting semiconductor bodies 11 to 13 are connected to the six terminals 65 to 67 of the package 1 separately from each other and can be operated separately from each other.

FIG. 1C shows only an example of a package. Other package shapes can also be used: The package 1 can be realized as a surface-mounted device, abbreviated SMD. For example, the package 1 may be realized as a quad flat no leads package, abbreviated QFN, a plastic leaded chip carrier, abbreviated PLCC, or a metal-core printed-circuit-board, abbreviated MCPCB. A PLCC can be configured as a PLCC4 (i.e. with four connections) or PLCC6 (i.e. with six connections).

FIG. 1D shows an exemplary embodiment of a table with characteristics of the assemblies or the light-emitting semiconductor bodies, respectively, which are a development of the exemplary embodiments shown in FIGS. 1A to 1C. Thereby, the table indicates:

- In column NR: number of the assembly (such as the numbers 1, 2, 3, and 4 of the number N of assemblies as shown in FIG. 1A and an indication n for an nth assembly),
- in column A: a pocket number and a data-matrix-code identification-number (DMC ID),
- in column B: a barcode product label information,
- in column C: a luminous intensity Iv, also called intensity, given in cd for the first semiconductor body 11, which emits in the red spectrum, for the second semiconductor body 12, which emits in the green spectrum, and for the third semiconductor body 13, which emits in the blue spectrum,
- in column D: the chromaticity coordinate values (also colorimetric values) CX, CY of the chromaticity coordinates of a color space according to the CIE standard valence system or CIE standard color system of the three semiconductor bodies of the different assemblies, i.e. the chromaticity coordinate values CxR, CyR of the first semiconductor bodies 11, 21, 31, 41, the chromaticity coordinate values CxG, CyG of the second semiconductor bodies 12, 22, 32, 42 and the chromaticity coordinate values CxB, CyB of the third semiconductor bodies 13, 23, 33, 43 (the color space can also be called tristimulus color space), and
- in column E: a forward voltage of the first, second, and third semiconductor body 11 to 13 of the various assemblies, expressed in volts.

The values for the luminous intensity Iv and the chromaticity coordinate Cx, Cy are measured at a predetermined current I. In the example shown in FIG. 1D, 10 mA is selected as the value of the current I. The current I corresponds to the level S10, S20, S30 of the driver signals S1, S2, S3. The measurements are performed at a predetermined duty cycle (e.g. 50% or 100%).

FIG. 1E shows another exemplary embodiment of a table which is a development of the exemplary embodiments shown in FIGS. 1A to 1D. In this example, 50 mA is selected as the value of the current I.

The rows of the tables in FIGS. 1D and 1E thus show the values of one assembly in each case. The numerical values given in FIGS. 1D and 1E are example values only. They serve exclusively to illustrate that the values of, for example, the semiconductor bodies emitting in the red spectrum are similar to each other, but not identical.

In FIGS. 1A to 1E, thus, a method is explained in which the assemblies of the number N of assemblies 1 to 4 are individually calibrated by the number N of driver arrangements 15, 25, 35, 45, in that each driver arrangement is assigned to exactly one assembly and the driver arrangement is adjusted corresponding to the data of the assigned assembly and depending on a target chromaticity coordinate and/or a target luminous intensity.

The data matrix code on the respective assembly 1 to 4 allows access to a database with individual data of this assembly 1 to 4 (an assembly is sometimes also referred to as an LED). The data is read in for each assembly and the first, second and third driver 16 to 18 is controlled in such a way that a target chromaticity coordinate is reached as accurately as possible. This is possible since each color in each LED is driven individually; in other words, each light-emitting semiconductor body 11 to 13 in each assembly 1 to 4 is driven individually. Details are described in FIG. 3A.

FIG. 2A shows an embodiment of a light emission arrangement 10, which is a development of the exemplary embodiments shown in FIGS. 1A to 1E. The light emission arrangement 10 comprises only one driver arrangement, namely the driver arrangement 15 with the first, second and third driver 16, 17, 18. A first series connection 71 comprises the first light-emitting semiconductor bodies 11, 21, 31, 41 of the number N of assemblies 1 to 4. The first light-emitting semiconductor bodies 11, 21, 31, 41 are thus connected in series. Correspondingly, a second series connection 72 comprises the second light-emitting semiconductor bodies 12, 22, 32, 42 of the number N of assemblies 1 to 4. Further, a third series circuit 73 comprises the third light-emitting semiconductor bodies 13, 23, 33, 43 of the number N of assemblies 1 to 4.

The driver arrangement 15 comprises the memory 51. Information on the first, second, and third pulse duration T1, T2, T3 is stored in the memory 51. Alternatively, information on the first, second, and third duty cycle D1, D2, D3 is stored in the memory 51. The information is provided to the driver arrangement 15 via an interface 68. In an example, the memory 51 comprises information about the first, second, and third pulse duration T1, T2, T3 or about the first, second, and third duty cycle D1, D2, D3 to achieve exactly one target chromaticity coordinate. Alternatively, the memory 51 comprises information about the first, second, and third pulse duration T1, T2, T3 or about the first, second, and third duty cycle D1, D2, D3 to achieve at least one target chromaticity coordinate or at least two target chromaticity coordinates or at least ten target chromaticity coordinates. Thus, in an example, the memory 51 stores multiple sets of parameters of the first, second, and third pulse duration T1, T2, T3 or the first, second, and third duty cycle D1, D2, D3. In an example, a control device is connected to the control circuit 55 during operation. During operation, the control device issues a command to the control circuit 55 as to which of the plurality of parameter sets is to be set.

In an alternative example, a control device is connected to the control circuit 55 during operation. Thereby, the control device transmits the parameter set to be set to the control circuit 55 during operation. The control circuit 55 stores the parameter set in the memory 51, for example. A memory of the control device stores the plurality of parameter sets, for example.

The driver arrangement 15 comprises the control circuit 55 connected to the memory 51. The control circuit 55 is realized, for example, as a microprocessor, microcontroller, state machine, gate device, or application specific integrated circuit (ASIC). The memory 51 is realized, for example, as a programmable memory. The control circuit 55 controls the first, second, and third driver 16 to 18 corresponding to the information stored in the memory 51 regarding the first, second, and third pulse duration T1, T2, T3 or the first, second, and third duty cycle D1, D2, D3. New PWM values, that is, for example, a new set of parameters such as the three pulse durations T1, T2, T3 or the three duty cycles D1, D2, D3, are sent to the control circuit 55 via a command, for example from the control unit, or are generated automatically depending on the temperature, for example. As soon as the PWM value is greater than 1 or alternatively greater than or equal to 1, a peak current, which flows through the LEDs, occurs at the corresponding driver 16 to 18. The three drivers 16 to 18 can be realized as low side drivers (controlled via a reference potential GND/cathode) or as high side drivers (controlled via a supply voltage Vcc/anode).

For example, the control circuit 55 comprises a counter. The counter starts counting at the beginning of a clock pulse of the first driver signal S1. A frequency of a clock signal supplied to the counter is much higher than the frequency F of the driver signals S1, S2, S3. The frequency F of the driver signals S1, S2, S3 is higher than 100 Hz, e.g. 500 Hz or 1 kHz. The frequency of the clock signal is, for example, 1 MHz or 8 MHz. In an example, the driver arrangement 15 realizes a resolution of the duty cycle D1 with 16 bits: Thereby, the frequency of the clock signal is higher than the frequency F of the driver signals S1, S2, S3 by at least a factor of 65535.

At the beginning of the clock pulse, a first output of the control circuit 55 is set to a first logical value (e.g., 1). The control circuit 55 compares the count of the counter with the information stored in the memory 51 or information derived therefrom. When the count of the counter reaches the information stored in the memory 51 or the information derived therefrom, the first output of the control circuit 55 is set to a second logical value (e.g., 0). Similarly, corresponding signals are generated at a second and a third output of the control circuit 55. Thus, three pulse width modulated signals are present at the first, second, and third output of the control circuit 55, which are converted into the three driver signals S1, S2, S3 by the three drivers 16 to 18. The driver arrangement 15 thus realizes a pulse width modulation circuit, also called PWM engine in English. The generation of the three driver signals S1, S2, S3 as a function of the information stored in the memory 51 can also be realized with other circuits. Other variations of the driver signals S1, S2, S3 are also possible, such as a staggered start of the clock pulses of the three driver signals S1, S2, S3 to achieve a more uniform current load.

The pulse duration T can be predefined. The pulse duration T can be constant. The first, second and third pulse duration T1, T2, T3 and/or the first, second and third duty cycle D1, D2, D3 are determined as a function of the parameters of the number N of assemblies 1 to 4 of the light emission arrangement 10. The pulse durations T1, T2, T3 and the duty cycles D1, D2, D3, respectively, are a function of the parameters of the number N of assemblies 1 to 4. The parameters are photometric quantities. The parameters are the luminous intensity Iv and/or the chromaticity coordinate values Cx, Cy.

During production of the light emission arrangement 10, the numbers of the assemblies of the number N of assemblies 1 to 4 are known. On the basis of the numbers of the number N of assemblies 1 to 4 and on the basis of the predetermined value for the level S10, S20, S30 of the driver signals S1, S2, S3 (corresponding to the value of the current I), the parameters of the light-emitting semiconductor bodies of the number N of assemblies 1 to 4 are determined. These values can be taken from a storage medium. The storage medium stores, for example, a table such as shown in FIGS. 1D and 1E. Depending on the luminous intensity Iv and on the two chromaticity coordinate values Cx, Cy, the first, second, and third pulse duration T1, T2, T3 and/or the first, second, and third duty cycle D1, D2, D3 can be determined. A target chromaticity coordinate and/or a target luminous intensity are taken into account. Based on these data, the possible target color and the setting of the R, G, B strands are calculated (as explained in FIGS. 3B and 3C).

The light emission arrangement 10 comprises a target chromaticity coordinate. Alternatively, the light emission arrangement 10 may comprise more than one target chromaticity coordinate. The light emission arrangement 10 is used, for example, for backlighting, accenting, or illumination. For example, to evoke different impressions, moods, accentuations, or other effects in an observer, the light emission arrangement 10 alternates between different chromaticity coordinates, such as controlled by a time, controlled by an event, or controlled by the user.

The light emission arrangement 10 is realized as a common cathode configuration. Thus, a cathode of the first light-emitting semiconductor body 41 of the nth assembly of the number N of assemblies 1 to 4 (i.e., the “last” assembly”) is connected to the terminal 19 of the driver arrangement 15. Similarly, a cathode of the second light-emitting semiconductor body 42 of the nth assembly of the number N of assemblies 1 to 4 is connected to the terminal 19 of the driver arrangement 15. A cathode of the third light-emitting semiconductor body 43 of the nth assembly of the number N of assemblies 1 to 4 is connected to the terminal 19 of the driver arrangement 15.

In an alternative embodiment not shown, the light emission arrangement 10 is realized as a common anode configuration. Thus, an anode of the first light-emitting semiconductor body 41 of the nth assembly of the number N of assemblies 1 to 4 is connected to the terminal 19 of the driver arrangement 15. Similarly, an anode of the second light-emitting semiconductor body 42 of the nth assembly of the number N of assemblies 1 to 4 is connected to the terminal 19 of the driver arrangement 15. An anode of the third light-emitting semiconductor body 43 of the nth assembly of the number N of assemblies 1 to 4 is connected to the terminal 19 of the driver arrangement 15.

FIG. 2B shows an exemplary embodiment of the light emission arrangement 10 and a method for operating a light emission arrangement 10, which are developments of the exemplary embodiments shown in the above figures. As shown in FIG. 2B, the data of the LED chips of the number N of assemblies 1 to 4 and one target chromaticity coordinates or several target chromaticity coordinates are supplied to an optimization method. The optimization method determines the parameters that are stored in the memory 51 of the driver arrangement 15. The optimization is configured to approximate the target chromaticity coordinate or the target chromaticity coordinates under the given interconnection. A separate set of parameters is stored in memory 51 for each target chromaticity coordinate.

With the known individual chromaticity coordinates R, G, B and their luminous intensities, a higher assembly accuracy, related to the required target chromaticity coordinate, can be achieved by simple averaging. In the case of standard components without this information, the average value of all the bins used would have to be calculated. Various algorithms are conceivable for averaging: Average value, median, arithmetic average value, quadratic average value, average value according to the method of least squares or error squares, center of gravity or maximum deviation.

Optionally, similar RGB LED chips on a reel are selectively populated on only one module, since the position in the belt is known. In other words, the method provides for the number N of modules to be populated with similar first light-emitting semiconductor bodies, with similar second light-emitting semiconductor bodies, and with similar third light-emitting semiconductor bodes. Similar may average, for example, that the first light-emitting semiconductor bodies belong to one bin, the second light-emitting semiconductor bodies belong to another bin, and the third light-emitting semiconductor bodies belong to another bin.

FIG. 2B shows an example with four assemblies per driver; however, other configurations are possible. In an alternative embodiment not shown, an assembly 1 to 4 comprises more than one first light-emitting semiconductor body, more than one second light-emitting semiconductor body, and/or more than one third light-emitting semiconductor body (each connected in series).

FIG. 2C shows an exemplary embodiment of a light arrangement 80 and a method for operating a light emission arrangement 10, which are developments of the exemplary embodiments shown in the figures above. The light arrangement 80 comprises the light emission arrangement 10 and at least one further light emission arrangement 81. The further light emission arrangement 81 comprises a number N1 of assemblies 83 to 86 and a further driver arrangement 91. Thereby, it is N1=4. In FIG. 2C, an additional light emission arrangement 82 is shown. The additional light emission arrangement 82 comprises a number N2 of assemblies 87 to 90 and an additional driver arrangement 92. Thereby, it is N2=4. The further light emission arrangement 81 and the additional light emission arrangement 82 are realized like the light emission arrangement 10. Thus, the light arrangement 80 comprises the number M of light emission arrangements 10, 81, 82. The number M is greater than 1. In this example, the number M is equal to 3. The number M can be greater than 2, greater than 3 or greater than 10. In FIG. 2C, the light emission arrangements of the number M of light emission arrangements each comprise the number N of assemblies (N1=N2=N). Thus, the number N of assemblies is identical in the different light emission arrangements. Thus, the number of assemblies of the light emission arrangement 80 is equal to N·M.

In the optimization method, the parameters of the driver arrangements 15, 91, 92 of the number M of light emission arrangements 10, 81, 82 are determined such that the chromaticity coordinates are as close as possible to the target chromaticity coordinate or the target chromaticity coordinates. Thus, the parameters of the driver arrangements of the number M of light emission arrangements are determined such that the chromaticity coordinates of the number M of light emission arrangements are as close as possible to an average value of the chromaticity coordinates of the number M of light emission arrangements and this average value is as close as possible to the target chromaticity coordinate. In the case of several target chromaticity coordinates, parameters comprise multiple sets of parameters.

In contrast, in the optimization method according to in FIG. 2B, for each individual light emission arrangement, the parameters of the driver arrangement 15 are determined such that the chromaticity coordinate of the individual light emission arrangement 10 is as close as possible to the target chromaticity coordinate or the target chromaticity coordinates.

With advantage, the optimization aims at the best possible homogeneity of the assemblies of the light emission arrangements (also called LEDs of all modules) in defined tolerance of the global target chromaticity coordinate.

Due to the known individual chromaticity coordinates R, G, B as well as their luminous intensities, a higher accuracy, related to the required target chromaticity coordinate, can be achieved by simple averaging of all assemblies. Various algorithms are conceivable for averaging: average value, median, arithmetic average value, quadratic average value, average value according to the method of least squares or error squares, center of gravity, maximum deviation. For standard components, without this information, the average values of all used bins would have to be calculated. Additionally, there is the optional possibility to distribute similar assemblies (called RGB LEDs) from one or more reels evenly over all light emission arrangements (also called modules) to increase the equality of the number M of light emission arrangements 10, 81, 82, if e.g. the position in the reel or belt is known.

FIG. 2C shows an example with three light emission arrangements 10, 81, 82; other configurations are possible.

In an alternative embodiment not shown, the numbers N, N1, N2 of assemblies in the light emission arrangements are different from the number M of light emission arrangements 10, 81, 82.

FIG. 3A shows an exemplary embodiment of a method for operating a light emission arrangement 10, which is a development of the exemplary embodiments shown in the above figures. FIG. 3A illustrates an example of a method suitable, for example, for the light emitting arrangement 10 shown in FIG. 1A. For example, this method can be used to identify the first, second, and third duty cycle $D1\_i$, $D2\_i$, $D3\_i$ for each assembly of the number N of assemblies 1 to 4 shown in FIG. 1A (with i=1 to the number N). Thus, a number N of first duty cycles D1_1, D1_2, D1_2, D1_4, a number N of second duty cycles D2_1, D2_2, D2_2, D2_4, and a number N of third duty cycles D3_1, D3_2, D3_2, D3_4 are identified.

The first, second, and third duty cycle D1_*i*, D2_*i*, D3_*i* of an assembly are determined as a function of the measured values of this assembly, in particular the luminous intensity Iv and the chromaticity coordinate values Cx, Cy, and as a function of the target chromaticity coordinate and the target luminous intensity.

The method comprises the following steps:

1. Optical measurements are performed on an assembly 1 or i. Thereby, the optical measurements are performed individually for the first, second, and third light-emitting semiconductor body 11 to 13. Thus, the luminous intensity Iv and the chromaticity coordinate values Cx, Cy are determined for the first, second, and third light-emitting semiconductor body 11 to 13. In the following, the first, second, and third light-emitting semiconductor body 11 to 13 are referred to as R, G, B. The first light-emitting semiconductor body 11 has a luminous intensity IvR and chromaticity coordinate values CxR, CyR. The second light-emitting semiconductor body 12 has a luminous intensity IvG and chromaticity coordinate values CxG, CyG. The third light-emitting semiconductor body 13 has a luminous intensity IvB and chromaticity coordinate values CxB, CyB. Alternatively, tristimulus coordinates are available for the first, second, and third semiconductor body 11 to 13. The measured values are stored in a database.
2. A tristimulus matrix A of the measured values of the assembly 1 or i, also called input RGB LED values, is identified. Optionally, the luminous intensity Iv and/or the chromaticity coordinate values Cx, Cy or the tristimulus coordinates may be changed with respect to the measured values as a function of a temperature, for example a temperature at the mounting location. This change can be based on information such as curves contained in a data sheet, for example.

$$A = \begin{bmatrix} XR & XG & XB \\ YR & YG & YB \\ ZR & ZG & ZB \end{bmatrix}; YR = IvR; YG = IvG; YB = IvB;$$

$$XR = YR\frac{CxR}{CyR}; XG = YG\frac{CxG}{CyG}; XB = YB\frac{CxB}{CyB};$$

$$ZR = YR\frac{1 - CxR - CyR}{CyR}; ZG = YG\frac{1 - CxG - CyG}{CyG};$$

$$ZB = YB\frac{1 - CxB - CyB}{CyB}$$

3. A target chromaticity coordinate and a target luminous intensity T are determined within the color range that can be achieved with assembly 1. The target chromaticity coordinate and the target luminous intensity T are specified in tristimulus coordinates.

$$T = \begin{bmatrix} TX \\ TY \\ TZ \end{bmatrix}$$

4. A quantity X contains a first, second, and third duty cycle D1_*i*, D2_*i*, D3_*i* of assembly i to achieve the target chromaticity coordinate and the target luminous intensity T.

$$X = \begin{bmatrix} \text{D1\_i} \\ \text{D2\_i} \\ \text{D3\_i} \end{bmatrix}$$

5 The following linear equation is, thus, be solved:

$$A \cdot X = T \rightarrow X = T \cdot (1/A)$$

The linear equation can be identified, for example, with inverse matrix calculations or determinant calculations. According to the following equations, the first, second, and third duty cycle D1_*i*, D2_*i*, D3_*i* of assembly i can be determined with determinant calculations:

$$\text{D1\_i} = \frac{\det(A1)}{\det(A)}; \text{D2\_i} = \frac{\det(A2)}{\det(A)}; \text{D3\_i} = \frac{\det(A3)}{\det(A)}$$

$$\det(A) = \det\begin{bmatrix} XR & XG & XB \\ YR & YG & YB \\ ZR & ZG & ZB \end{bmatrix};$$

$$\det(A1) = \det\begin{bmatrix} TX & XG & XB \\ TY & YG & YB \\ TZ & ZG & ZB \end{bmatrix};$$

$$\det(A2) = \det\begin{bmatrix} XR & TX & XB \\ YR & TY & YB \\ ZR & TZ & ZB \end{bmatrix};$$

$$\det(A3) = \det\begin{bmatrix} XR & XG & TX \\ YR & YG & TY \\ ZR & ZG & TZ \end{bmatrix}$$

A determinant of a 3×3 matrix can be calculated with the following equation:

$$\det\begin{bmatrix} a11 & a12 & a13 \\ a21 & a22 & a23 \\ a31 & a32 & a33 \end{bmatrix} = a11 \cdot a22 \cdot a33 + a12 \cdot a23 \cdot a31 + a13 \cdot a21 \cdot a32 - a12 \cdot a21 \cdot a33 - a13 \cdot a22 \cdot a31 - a23 \cdot a32 \cdot a11$$

In blocks 101 to 104, the calculation of the first, second, and third duty cycle D1_*i*, D2_*i*, D3_*i* is performed for all assemblies i=1 up to the number N. Further, an information about the first, second, and third duty cycle D1_*i*, D2_*i*, D3_*i* of an assembly i is stored in the memory 51 to 54 of the respective assembly 1 to 4.

FIG. 3B shows an exemplary embodiment of a method for operating a light emission arrangement 10, which is a development of the exemplary embodiments described above. In FIG. 3B an example of a method suitable for, for example, the light emission arrangement 10 shown in FIGS. 2A to 2C is described. In blocks 101 to 104, a calculation of a first, second, and third target duty cycle D1_*i*s, D2_*i*S, D3_*i*S is performed for all assemblies i=1 up to the number N. The word "target" is used to express that the target duty cycles D1_*i*S, D2_*i*S, D3_*i*S are not directly stored in a memory of the light emission arrangement 10. The target duty cycles D1_*i*s, D2_*i*S, D3_*i*S are determined like the duty cycles D1_*i*, D2_*i*, D3_*i* in FIG. 3A.

In a block 105, an average value of a number N of target duty cycles D1_1S to D1_4S of the first light-emitting semiconductor bodies 11, 21, 31, 41 of the number N of assemblies 1-4 is calculated, wherein the average value is the first duty cycle D1 of the first driver 16. Similarly, an average value of a number N of target duty cycles D2_1S to D2_4S of the second light-emitting semiconductor bodies 12, 22, 32, 42 of the number N of assemblies 1-4 is calculated, wherein the average value is the second duty cycle D2 of the second driver 17. Further, an average value of a number N of target duty cycles D3_1S to D3_4S of the third light-emitting semiconductor bodies 13, 23, 33, 43 of the number N of assemblies 1-4 is calculated, wherein the average value is the third duty cycle D3 of the third driver 18. An information (such as the value or a derived quantity) of the first, second, and third duty cycle D1 is stored in the memory 51 of the driver arrangement 15.

In one embodiment, the white point is selected as the target chromaticity coordinate. The first, second, and third duty cycle D1, D2, D3 is determined for the target chromaticity coordinate white point. The first, second, and third duty cycle D1, D2, D3 for a target chromaticity coordinate other than the white point is determined using the first, second, and third duty cycle D1, D2, D3 for the target chromaticity coordinate white point and of predetermined formulas.

For example, the first duty cycle D1 for a target chromaticity coordinate that is not the white point is identified by multiplying or dividing the first duty cycle D1 for the target chromaticity coordinate white point by a first predetermined factor. Accordingly, the second duty cycle D2 for this target chromaticity coordinate, which is not the white point, is identified by multiplying or dividing the second duty cycle D2 for the target chromaticity coordinate white point by a second predetermined factor. Accordingly, the third duty cycle D3 for this target chromaticity coordinate, which is not the white point, is identified by multiplying or dividing the third duty cycle D3 for the target chromaticity coordinate white point by a third predetermined factor.

The calculations described herein, for example in blocks 101 to 105, are performed in a computer or control device external to the light emission arrangement 10 or in the control circuit 55.

FIG. 3C shows an exemplary embodiment of a method for operating a light emission arrangement 10, which is a development of the exemplary embodiments described above. In FIG. 3C an example of a method suitable, for example, for the light emission arrangement 10 shown in FIGS. 2A to 2C is described. In a block 110, at least one photometric quantity of the first light-emitting semiconductor bodies 11, 21, 31, 41 of the number N of assemblies 1-4 is averaged; tristimulus coordinates XR, YR, ZR are calculated therefrom. In a block 111, at least one photometric quantity of the second light-emitting semiconductor bodies 12, 22, 32, 42 of the number N of assemblies 1-4 is averaged; tristimulus coordinates XG, YG, ZG are calculated therefrom. In a block 112, at least one photometric quantity of the third light-emitting semiconductor bodies 13, 23, 33, 43 of the number N of assemblies 1-4 is averaged; tristimulus coordinates XB, YB, ZB are calculated therefrom. In a block 113, the first, second and third duty cycles D1, D2, D3 are determined corresponding to a target chromaticity coordinate and/or a target luminous intensity (indicated as tristimulus coordinates TX, TY, TZ of the target) and corresponding to the tristimulus coordinates XR, YR, ZR, XG, YG, ZG, XB, YB, ZB averaged from the tristimulus coordinates XR, YR, ZR, XG, YG, XB, YB, ZB as described above with reference to FIG. 3A. The blocks 101 to 105, 110 to 113 summarize method sequences or method steps. The blocks can be realized e.g. by means of software. They can be executed, for example, by a computer or control device. The computer or control device has access to the measured photometric quantities and is designed, for example via the interface 68, to store information in the memory 51. Alternatively, the control circuit 55 performs the blocks or part of the method sequences of the blocks.

The invention is not limited to the embodiments by the description of the invention based on the exemplary embodiments. Rather, the invention encompasses any new feature as well as any combination of features, which, in particular, includes any combination of features in the claims, even if that feature or combination itself is not explicitly recited in the claims or exemplary embodiments.

LIST OF REFERENCE SIGNS 1, 2, 3, 4 assembly
10 light emission arrangement
11, 21, 31, 41 first light-emitting semiconductor body
12, 22, 32, 42 second light-emitting semiconductor body
13, 23, 33, 43 third light-emitting semiconductor body
14, 24, 34, 44 package
15, 25, 35, 45 driver arrangement
16, 26, 36, 46 first driver
17, 27, 37, 47 second driver
18, 28, 38, 48 third driver
19, 29, 39, 49 terminal
51 to 54 memory
55 to 58 control circuit
61, 62, 63 light-emitting diode chip
64 recess
65, 66, 67 terminal
68 interface
71, 72, 73 series connection
80 light arrangement
81, 82 light emission arrangement
83-90 assembly
91, 92 driver arrangement
101 to 104 block
110 to 113 block
D1, D2, D3 duty cycle
S1, S2, S3 driver signal
t time
T period
T1, T2, T3 pulse duration

The invention claimed is:

1. A light emission arrangement comprising
a driver arrangement comprising a first, a second, and a third driver, and
a number N of assemblies, each comprising a first, a second, and a third light-emitting semiconductor body,
wherein the number N is greater than 1,
wherein the first driver is coupled to a first series connection comprising the first light-emitting semiconductor bodies of the number N of assemblies,
wherein the second driver is coupled to a second series connection comprising the second light-emitting semiconductor bodies of the number N of assemblies,
wherein the third driver is coupled to a third series connection comprising the third light-emitting semiconductor bodies of the number N of assemblies,
wherein the first, the second, and the third driver are each configured to output a driver signal, which depends on photometric quantities of the first, the second, and the third light-emitting semiconductor bodies of the number N of assemblies, wherein the driver arrangement comprises a memory, wherein the first, the second, and the third driver are each configured to output a pulse width modulated driver signal with a first, a second, and a third duty cycle and to adjust the first, the second, and the third duty cycle corresponding to an information stored in the memory, wherein at least one photometric quantity of the first light-emitting semiconductor bodies of the number N of assemblies is averaged, wherein at least one photometric quantity of the second light-emitting semiconductor bodies of the number N of assemblies is averaged, wherein at least one photometric quantity of the third semiconductor light-emitting bodies of the number N of assemblies is averaged, and wherein the first duty cycle of the first driver, the second duty cycle of the second driver, and the third duty cycle of the third driver are determined corresponding to at least one of a target chromaticity coordinate or a target luminous intensity and corresponding to the average values of the at least one photometric quantity.

2. The light emission arrangement according to claim 1, wherein the first duty cycle of the first driver is an average value of a number N of target duty cycles of the first light-emitting semiconductor bodies of the number N of assemblies, wherein the second duty cycle of the second driver is an average value of a number N of target duty cycles of the second light-emitting semiconductor bodies of the number N of assemblies, and wherein the third duty cycle of the third driver is an average value of a number N of target duty cycles of the third light-emitting semiconductor bodies of the number N of assemblies.

3. The light emission arrangement according to claim 2, wherein the target duty cycles of the first, the second and the third light-emitting semiconductor body in an assembly of the number N of assemblies are determined assembly by assembly in dependence of the photometric quantities of the first, the second, and the third light-emitting semiconductor body corresponding to at least one of a target chromaticity coordinate or a target luminous intensity.

4. The light emission arrangement according to claim 1, wherein the at least one photometric quantity comprises:

a luminous intensity of the first, the second, and the third light-emitting semiconductor bodies or a luminous intensity and both chromaticity coordinate values of the first, the second, and the third light-emitting semiconductor body or tristimulus coordinates of the first, the second, and the third light-emitting semiconductor bodies.

5. The light emission arrangement according to claim 1, wherein at least one driver from a group comprising the first, the second, and the third driver is configured to adjust a level of the pulse width modulated driver signal corresponding to an information stored in the memory.

6. The light emission arrangement according to claim 1, wherein the first light-emitting semiconductor bodies are realized as light-emitting diode chips emitting in the red spectrum, wherein the second light-emitting semiconductor bodies are realized as light-emitting diode chips emitting in the green spectrum, and wherein the third light-emitting semiconductor bodies are realized as light-emitting diode chips emitting in the blue spectrum.

7. The light emission arrangement according to claim 1, wherein an assembly of the number N of assemblies each comprises a package.

8. A method for operating a light emission arrangement, wherein the light emission arrangement comprises a number N of assemblies each comprising a first, a second, and a third semiconductor light-emitting body, wherein the method comprises operating a first series connection comprising the first light-emitting semiconductor bodies of the number N of assemblies with a first driver signal by a first driver of a driver arrangement, operating a second series connection comprising the second light-emitting semiconductor bodies of the number N of assemblies with a second driver signal by a second driver of the driver arrangement, and operating a third series connection comprising the third light-emitting semiconductor bodies of the number N of assemblies with a third driver signal by a third driver of the driver arrangement, wherein the number N is greater than 1, wherein the first, the second, and the third driver signals depend on photometric quantities of the first, the second, and the third light-emitting semiconductor bodies of the number N of assemblies, wherein the first, the second, and the third drivers each output a pulse width modulated driver signal with a first, a second, and a third duty cycle and adjust the first, the second, and the third duty cycle corresponding to an information stored in a memory of the driver arrangement, and wherein the method further comprises:

identifying a first average value of at least one photometric quantity of the first semiconductor light-emitting bodies of the number N of assemblies, identifying a second average value of at least one photometric quantity of the second light emitting semiconductor bodies of the number N of assemblies, identifying a third average value of at least one photometric quantity of the third light-emitting semiconductor bodies of the number N of assemblies, and determining the first duty cycle of the first driver, the second duty cycle of the second driver, and the third duty cycle of the third driver corresponding to at least one of a target chromaticity coordinate or a target luminous intensity and corresponding to the first, second, and third average value of the at least one photometric quantity.

9. The method according to claim 8, wherein the method comprises:

determining the first duty cycle of the first driver by identifying an average value of N target duty cycles of the first light-emitting semiconductor bodies of the number N of assemblies, determining the second duty cycle of the second driver by identifying an average value of N target duty cycles of the second light-emitting semiconductor bodies of the number N of assemblies, and determining the third duty cycle of the third driver by identifying an average value of N target duty cycles of the third light-emitting semiconductor bodies of the number N of assemblies.

10. The method according to claim 9, wherein the target duty cycles of the first, the second, and the third light-emitting semiconductor body in an assembly of the number N of assemblies are determined assembly by assembly corresponding to at least one of a target chromaticity coordinate or a target luminous intensity.

11. The method according to claim 9, wherein one or more of the first, second or third average value is calculated as an arithmetic average value, calculated as a median, calculated as a quadratic average value, or calculated according to the method of the least squares.

12. The method according to claim 8, wherein the at least one photometric quantity comprises:

a luminous intensity of the first, the second, and the third light-emitting semiconductor body or a luminous intensity and both chromaticity coordinate values of the first, the second, and the third light-emitting semiconductor body or tristimulus coordinates of the first, the second, and the third light-emitting semiconductor body.

13. The method according to claim 8, wherein a light arrangement comprises a number M of light emission arrangements, wherein the number M is greater than 1, wherein a light emission arrangement of the number M of light emission arrangements comprises the number N of assemblies, and wherein the first, the second, and the third driver signals depend on photometric quantities of the first, the second, and the third light-emitting semiconductor bodies of the assemblies of the number M of light emission arrangements.

14. A light emission arrangement comprising a driver arrangement comprising a first, a second, and a third driver, and a number N of assemblies, each comprising a first, a second, and a third light-emitting semiconductor body, wherein the number N is greater than 1, wherein the first driver is coupled to a first series connection comprising the first light-emitting semiconductor bodies of the number N of assemblies, wherein the second driver is coupled to a second series connection comprising the second light-emitting semiconductor bodies of the number N of assemblies, wherein the third driver is coupled to a third series connection comprising the third light-emitting semiconductor bodies of the number N of assemblies, wherein the first, the second, and the third driver are each configured to output a driver signal, which depends on photometric quantities of the first, the second, and the third light-emitting semiconductor bodies of the number N of assemblies, wherein the driver arrangement comprises a memory, wherein the first, the second, and the third driver are each configured to output a pulse width modulated driver signal with a first, a second, and a third duty cycle and to adjust the first, the second, and the third duty cycle corresponding to an information stored in the memory, wherein the first duty cycle of the first driver is an average value of a number N of target duty cycles of the first light-emitting semiconductor bodies of the number N of assemblies, wherein the second duty cycle of the second driver is an average value of a number N of target duty cycles of the second light-emitting semiconductor bodies of the number N of assemblies, and wherein the third duty cycle of the third driver is an average value of a number N of target duty cycles of the third light-emitting semiconductor bodies of the number N of assemblies.

* * * * *